G. P. THOMAS.
SPACING TABLE.
APPLICATION FILED MAY 27, 1914.
1,179,474.
Patented Apr. 18, 1916.
5 SHEETS—SHEET 1.
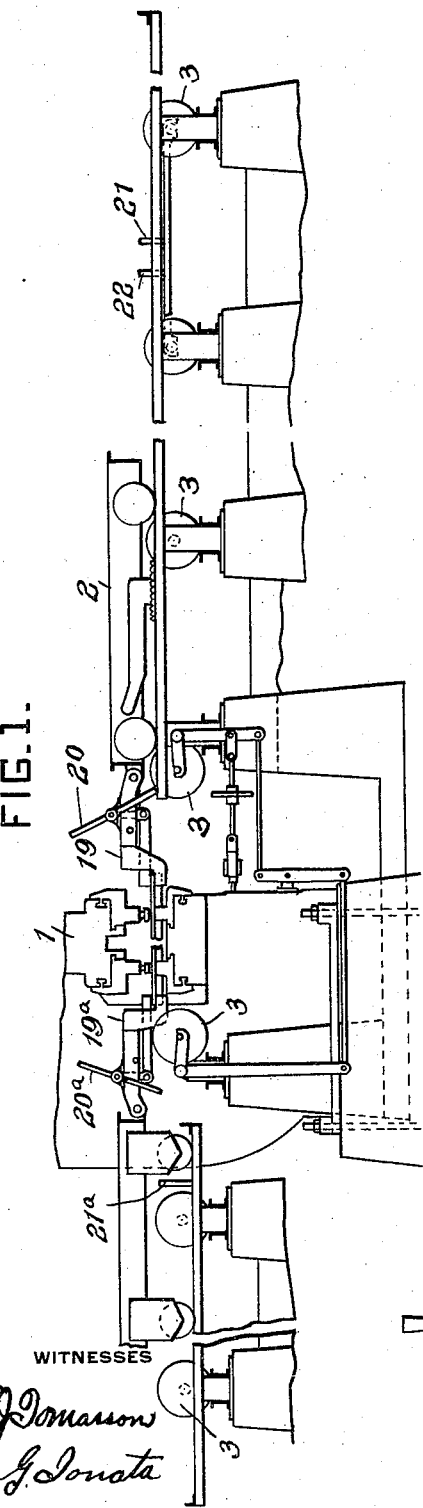
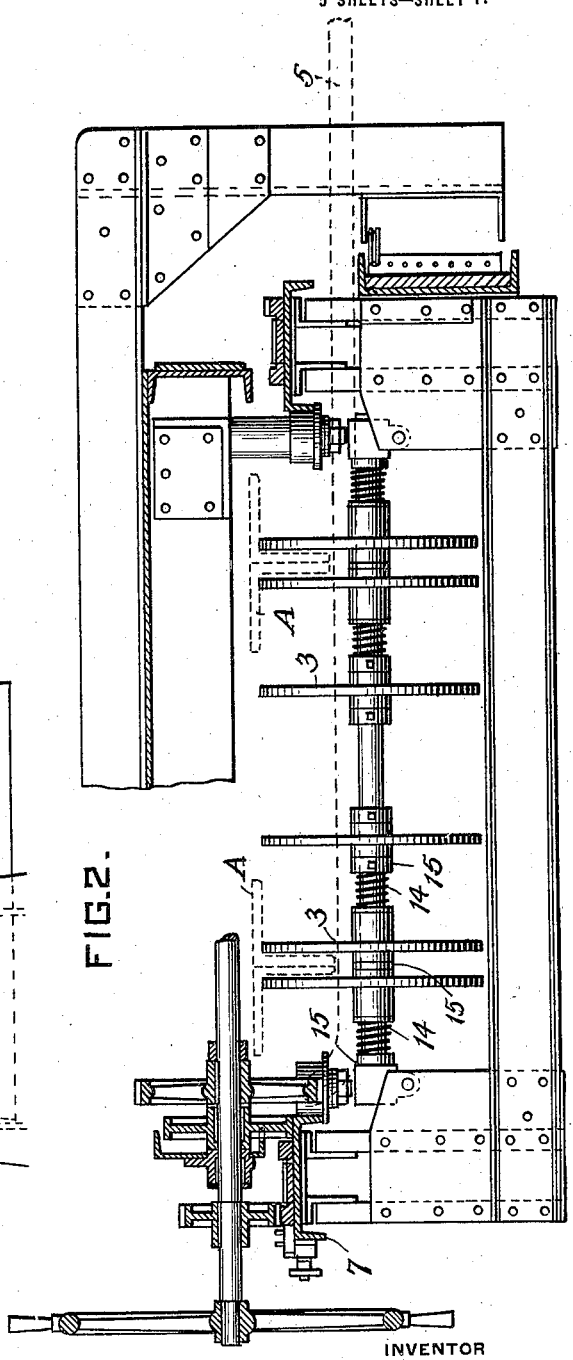
WITNESSES
INVENTOR
George Paul Thomas
by Christy and Christy
his attorneys.

G. P. THOMAS.
SPACING TABLE.
APPLICATION FILED MAY 27, 1914.
1,179,474.
Patented Apr. 18, 1916.
5 SHEETS—SHEET 2.
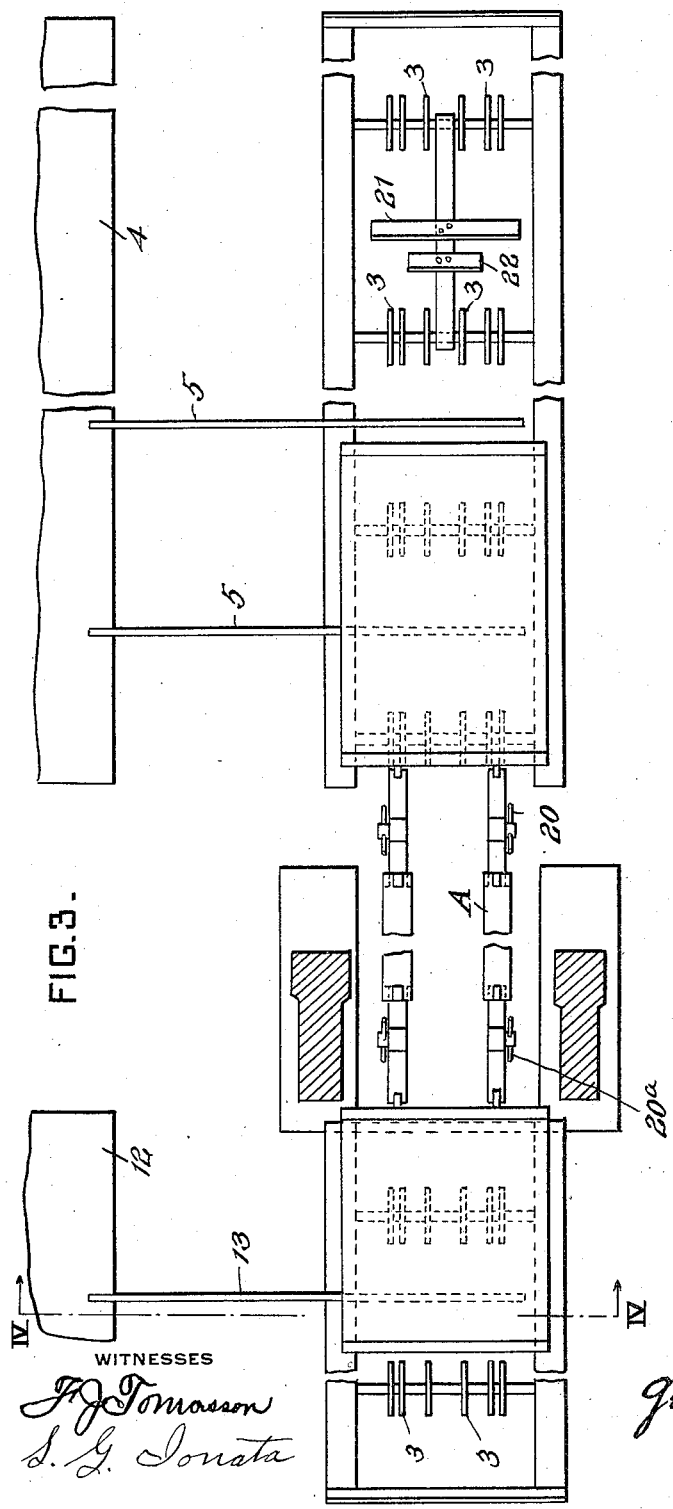
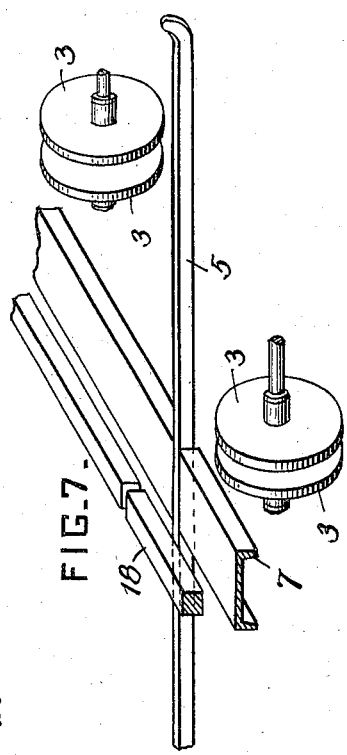
WITNESSES
INVENTOR
George Paul Thomas
by Christy and Christy
his attorneys.

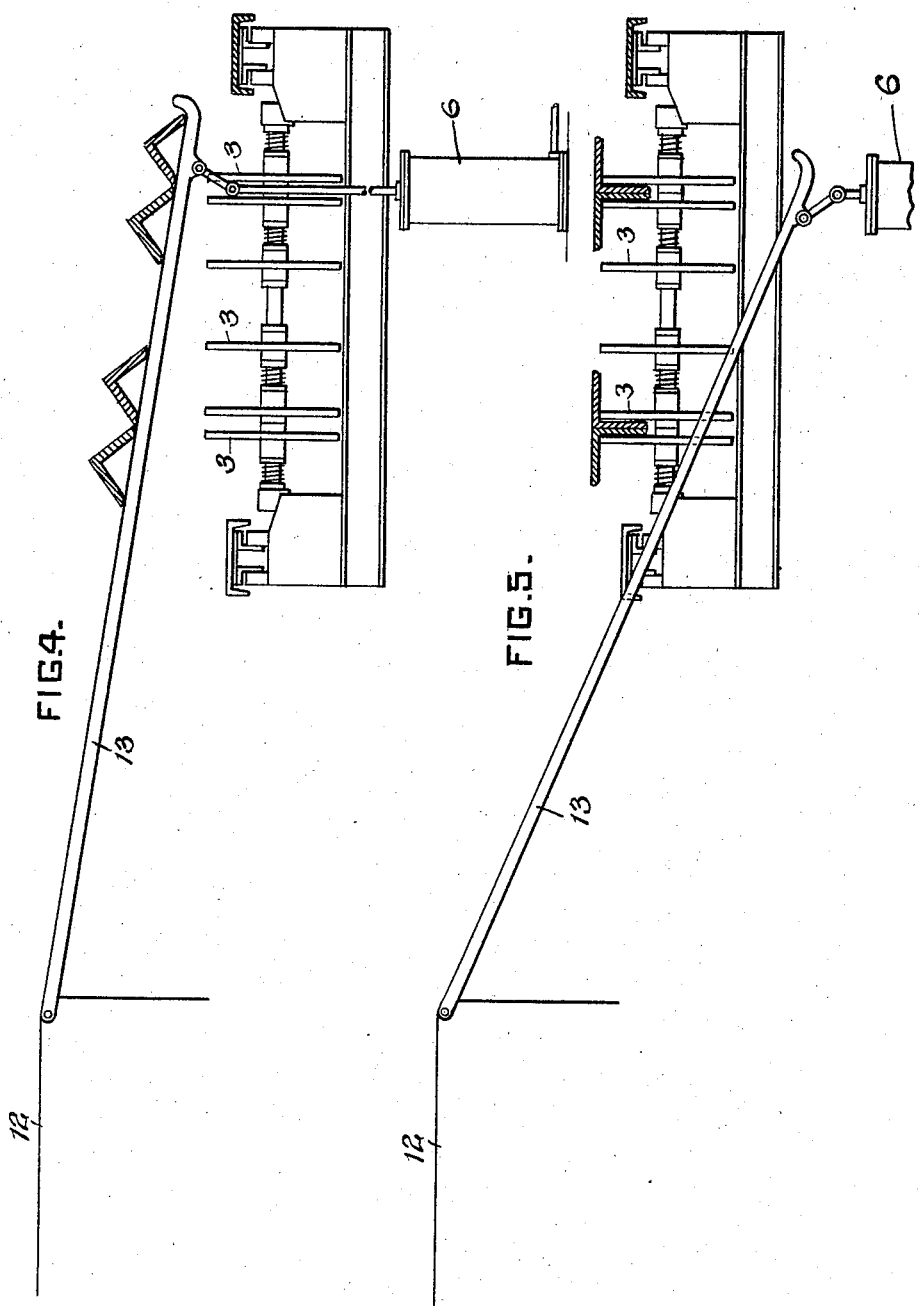

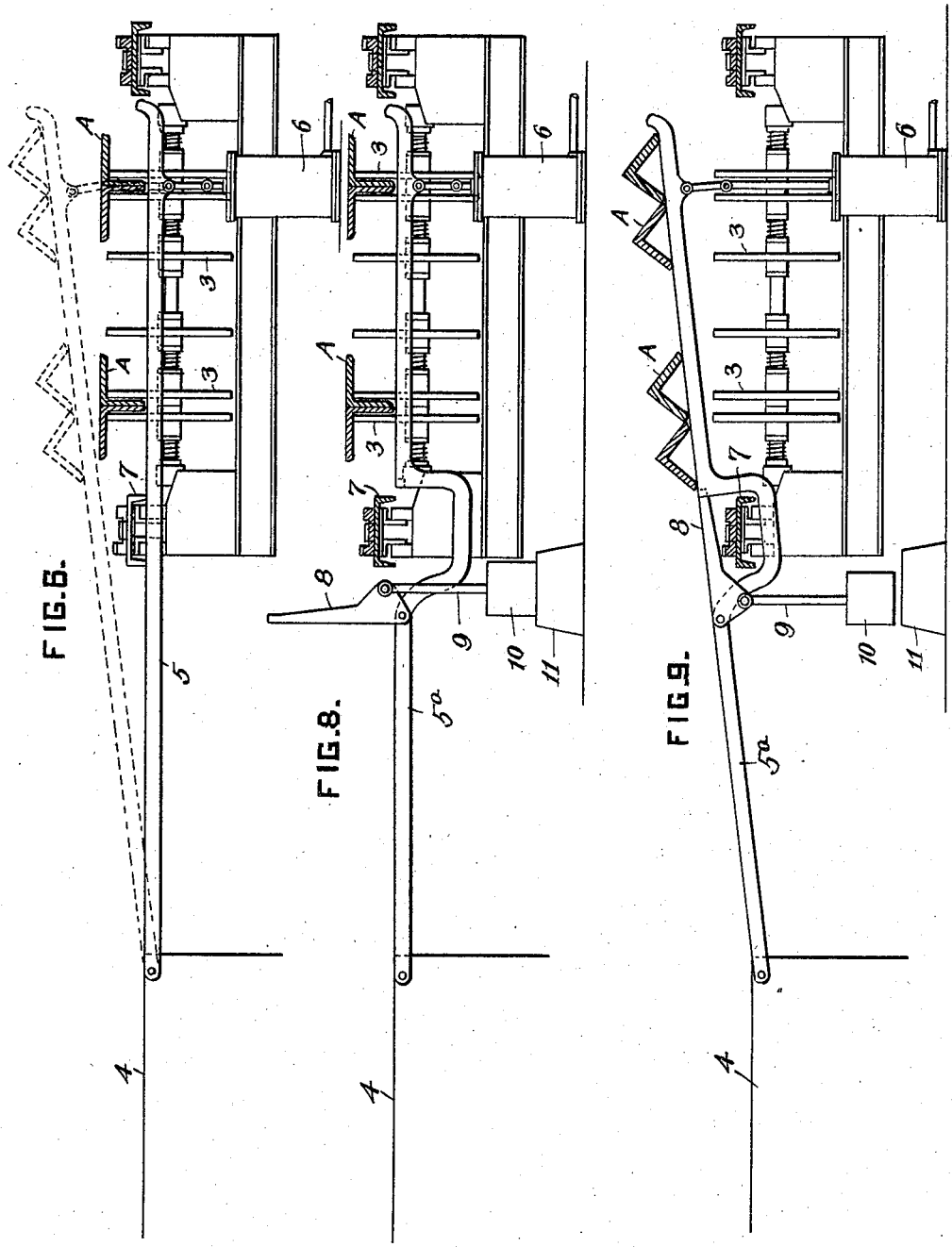

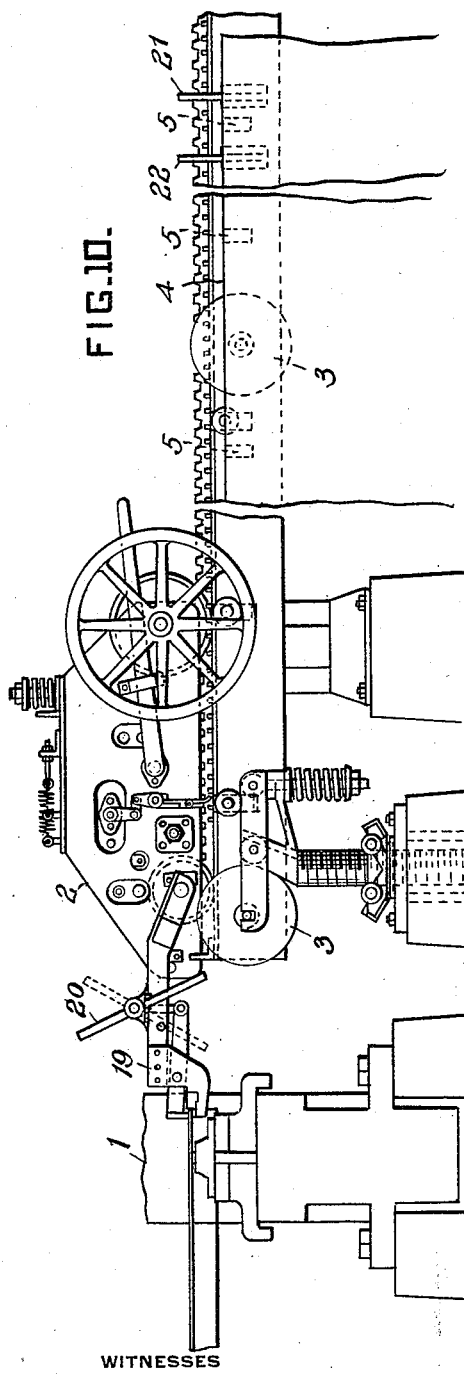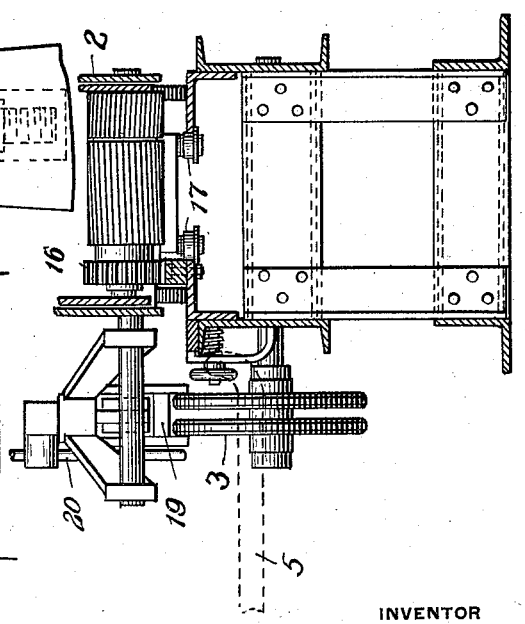

UNITED STATES PATENT OFFICE.

GEORGE PAUL THOMAS, OF GLENSHAW, PENNSYLVANIA.

SPACING-TABLE.

1,179,474.  Specification of Letters Patent.  Patented Apr. 18, 1916.

Application filed May 27, 1914. Serial No. 841,333.

*To all whom it may concern:*

Be it known that I, GEORGE P. THOMAS, residing at Glenshaw, in the county of Allegheny and State of Pennsylvania, a citizen of the United States, have invented or discovered certain new and useful Improvements in Spacing-Tables, of which improvements the following is a specification.

My invention relates to improvements in spacing-table mechanism for metal punches, and the object in view is facility in the handling of material.

In the accompanying drawings, Figure 1 is a view in side elevation of a machine in which my present invention is embodied; Fig. 2 is a view on larger scale of the same machine, in transverse vertical section, the work-carriage being illustrated in detail in different planes; Fig. 3 is a plan view of the same machine; Fig. 4 is a sectional view on the plane indicated at IV—IV, Fig. 3 (the carriage however retracted and the skids raised); Fig. 5 is a view otherwise identical with Fig. 4, showing the loading mechanism in alternate position and the work in place; Fig. 6 is a view similar to Figs. 4 and 5, showing not the loading but the unloading apparatus, and that in alternate positions; Fig. 7 is a view in perspective, illustrating a modification of the structure shown in Fig. 6; Figs. 8 and 9 illustrate a further modification in this regard; Fig. 10 shows in side elevation a machine designed for light work, with which my loading and unloading apparatus is combined to constitute specific features of invention; and Fig. 11 shows in cross section another machine of the same type as that shown in Fig. 10 with the unloading apparatus shown in operative position relative to the other parts.

Referring to Fig. 1, the punch will be seen at 1. In the operation of the machine the material is carried between the jaws of this punch, and rollers 3 are provided for the purpose of affording proper support and constituting a runway upon which the material may readily be advanced. As shown, the material travels from left to right. On the right-hand side of the punch is a carriage 2, mounted to travel on suitable tracks. To this carriage the work is attached and by its movement and stopping the advance and stopping of the material in its course through the punch are controlled and determined.

Referring to Figs. 2 and 3, a succession of transverse rows of rollers 3, forming an intermittent succession of supporting members, is shown arranged between the carriage tracks. The outer rollers of each row are arranged in pairs and each pair is shown (Fig. 2) supporting a pair of angle bars A—A, arranged side by side and supported as a unit upon the pair of rollers, each with one web extending horizontally. It will be understood that rollers and carriage and punch are all so arranged that as these pairs of angle bars are carried through the punch, the desired rivet holes in sequence and at proper intervals are punched in each of the horizontally extending webs.

My invention has primarily to do with the loading of the material upon the rollers 3 on the receiving side of the punch and the unloading it from the rollers on the delivery side of the punch. I shall in the ensuing description reverse the natural order and describe first the unloading apparatus, illustrated in Figs. 2, 3, and 6.

To one side of the succession of rollers 3 which constitute the support for the material as it is fed through the machine, and opposite that portion of its path to which the material comes when the punching work upon it is done, is arranged a suitable receiving platform 4 for the material which constitutes a support for the material awaiting its turn to be punched; and means are provided for automatically transferring the material from its place in the machine to the place of deposit or accumulation or of delivery to further handling. Such means may conveniently extend transversely between this platform and the path in which the material advances from the punch and may consist of a suitable number of arms 5, to constitute gravity skids, over which the material may slide, from the rollers 3 to the platform 4. The arms 5 are made movable, that they may at proper time engage the material A, and raise it free of rollers 3 before it slides aside to platform 4, and also, in order that in the intervals when they are not in service the arms 5 may be swung aside, out of the way of the other moving parts.

I shall describe one particular arrangement of such movable arms, but it will be apparent to any engineer that other arrangements are quite possible and practicable, and I wish my particular showing here to be understood to be by way of illustration, rather than by way of limitation.

The arms 5 are pivoted at their outer ends, adjacent platform 4; they extend across in the intervals between succeeding transverse rows of rollers 3; and are, at or near their inner ends, engaged by the piston rods of pneumatic cylinders 6 and are thus caused to rise and fall, turning on their pivots. When inactive, the arms 5 are in their lower position, indicated in full lines, Fig. 6. When a set of angle bars such as is indicated by A, comes to position for unloading, the arms 5 are raised; as they rise they engage the bars A from beneath, lift them free of the rollers 3 and to a position from which they will slide by gravity laterally over the arms themselves to the platform 4,—and this without manual moving of the bars, until they come to the platform. When a load of angle bars or other material has thus been unloaded from the runway of the machine, the arms 5 are swung down again to inactive position.

It will be apparent that with the arrangement of parts shown in Fig. 6, the arms 5 must in their alternate positions extend beneath the carriage tracks 7, that they may be out of the way of carriage advance, and again they must extend above these tracks, that they may afford a free skidway for the material, I show alternative means for accomplishing this result, and again do not mean to indicate that my showing here exhausts the possibilities of my invention. In one case (Fig. 6) the carriage track may be understood to be cut through, to allow the free swinging of the arms 5. In another case, illustrated in Fig. 7, the arm itself is so shaped and proportioned that when in its lower and inactive position its body bridges the gap in the carriage track. In this instance the rail 18 (shown to be cut for the passage of the arm 5) is a bearing rail for taking the lateral thrust of the moving carriage; but the weight sustaining rail 7 is made continuous by the substance of arm 5 itself filling the gap. This specific arrangement is best suited for machines which handle material of relatively small thickness, such as plates. A third arrangement is shown in Figs. 8 and 9; the arms $5^a$ are there shown to be interrupted in their skid surfaces, and to have each a U-shaped offset beneath the track 7; an auxiliary arm 8 swings from a vertical to a horizontal position as the main arm $5^a$ is raised, and thus bridges the interruption of the main arm, to afford a continuous skidway for the material. The particular arrangement and movement of the illustrative embodiment of this auxiliary bridging arm will be at once understood by considering Figs. 8 and 9, wherein such arm is shown as being pivoted to the main arm $5^a$, and to a rod 9 provided with a weight 10, which weight, when the arm $5^a$ is down, rests upon a suitable platform 11. As the arm $5^a$ is elevated, the rod 9 becomes a suspensory member, the weight 10 causing the arm 8 to swing on its pivot to the bridging position indicated in Fig. 9. When the main arm swings down the weight 10 rests upon the platform 11 and rod 9 becomes a prop, which, as the main arm descends, causes the bridging arm to swing to vertical position, leaving the runway of the carriage free and unobstructed. This particular arrangement of Figs. 8 and 9 is more advantageous in case the material when in course of unloading has to be carried across spacing-table apparatus, such as templates, stop teeth, and the like, as well as across carriage tracks, for these parts are often parts which require great delicacy of position and spacing and may not always advisedly be cut through, as the carriage-track may be cut, as has already been said.

Coming now to consider the loading apparatus, on the receiving side of the punch, there is provided adjacent the path of advance of the material, and opposite a point where the material lies free but ready to advance to the punch, a platform 12 (Figs. 3 and 4) or like place where the material may rest in readiness for application to the machine. Means are provided for transferring the material from the platform to its position in the punching machine; and the means may consist of pivoted arms 13, substantially identical with the arms 5 already described and employed on the delivery side of the machine. The operation of these arms is the converse of that of the arms 5 and requires no additional description, further than to remark that they are preferably so arranged that when raised to the position indicated in Fig. 4 the work set at the receiving side of the punch may be moved from the platform 12 to the arms 13 and then caused to slide by gravity down the arms to the runway of the machine. Since on the receiving side of the punches there is not ordinarily any spacing mechanism, but only car-tracks for the trailer carriage—and not even that in every case, for a trailer carriage engaging the rear of the work is not always used—it will not ordinarily be necessary nor desirable to use the more elaborate structure of the arm illustrated in Figs. 8 and 9, but rather the simpler form of Fig. 6, and, if car tracks be present, they may be cut through; and, as already explained, the arm itself may (if desired) be so proportioned and its movement so controlled that when in inactive position its body may bridge the gap in the track, after the manner in which skid 5 bridges the gap in rail 7, as shown in Fig. 7. With this explanation, Figs. 4 and 5, illustrating the loading apparatus, and showing the arms 13 in alternate positions will be fully understood.

Thus far in this specification I have confined attention to a machine in which the work is drawn in a path directly to rearward of the spacing carriage and between the carriage tracks.

It is a further feature of my invention to arrange the runway for the work and the path of travel for the carriage in the manner illustrated in Figs. 10 and 11. In these two figures are shown two machines, differing somewhat in detail, but alike in this: that the rollers 3 which constitute the runway for the work are arranged to one side of the path of carriage advance; and the work-engaging jaws 19 with which the carriage is equipped extend laterally from the carriage to engage the work and draw it along its lateral runway. It will be observed (Fig. 11) that in this machine the carriage is propelled by the turning of a carriage-borne pinion 16 which engages a rack on the stationary table. This pinion is arranged to one side of the center of gravity of the carriage (adjacent one of the supporting wheels) and the runway for the work (consisting in this case of the rollers 3) is arranged on the same side of the carriage with the pinion 16. It will be apparent that while the point of the application of the driving power is not central but to one side of the unloaded carriage, when the carriage is loaded, the load on the rollers 3 tends to balance the weight of the carriage itself, on the other side of pinion 16, and thus the arrangement is such as to bring the point of application of power near the center of gravity of the loaded carriage as a whole. This arrangement is advantageous in building machines intended for light work.

Manifestly, if it were a mere matter of dragging the work along in a definite path, an exactly symmetrical arrangement of carriage and load would be best, and power would be advantageously applied exactly on the center line. But the problem of loading and unloading makes this non-symmetrical arrangement advantageous—especially for light work, where the weight of the load is not greatly in excess of the weight of the carriage itself. The first and obvious advantage is that the runway for the work is more accessible to workmen, and the material may be lifted to and from the runway without the lateral reaching across car tracks and spacing apparatus, otherwise necessary; and the further advantage is that the loading and unloading skid-arms already described (5 and 13) may be employed, without the necessity of cutting through car tracks or spacing-table apparatus. This is clearly indicated in Fig. 11.

It will be observed of the carriage of Fig. 11 that rollers 17, journaled vertically in the under side of the carriage bear upon properly disposed rails in the table and hold the carriage against angling and skewing. This arrangement permits greater latitude in weight of load.

A further feature of my invention has to do with the proper support of such material as the angle bars A when, after being transferred to their supporting rollers 3, they are undergoing the punching operation. When a succession of rivet holes is punched in the web of an angle-bar or like piece of material, the tendency of the metal to stretch under the action of the punch, unrestrained along one edge of the web, is along the other edge restrained by the substance of the other web. The effect of this tendency is a certain distortion, a bowing of the angle bar in the then horizontal plane, the free edge of the web being the convex edge of the bow. Unless means be provided to take care of this matter, the distortion may be such as to cause the work to bind between rollers 3 so closely as to prevent removal by the described action of arms 5.

I so mount the rollers 3 that they may slide upon the axles which sustain them (and so yield to the bowing of the material under treatment), but I control such sliding of the rollers by springs 14 (Fig. 2), abutting against fixed collars 15 on the axles of rollers 3 and exerting their tension when under compression to hold the rollers against displacement. By such means, the bowing of the material is provided for, and at the same time such bowing of the material is not allowed to be a variably disturbing factor in the operation of the machine, but is taken into account and the effect controlled and regulated; and the material when punched is readily removable by arms 5.

Means may be provided, coöperating with the unloading mechanism, for automatically freeing the material from its engagement by the carriage when it advances to the position from which it is to be transferred. While various instrumentalities may be employed for this purpose, those shown for illustrative purposes are indicated in Figs. 1, 3, and 10. The advancing carriage may be provided with a movable member, a lever 20 (and the trailer, if there be one, with a corresponding member 20$^a$), which when the proper point in carriage advance is reached may engage a fixed abutment 21 (and 21$^a$) and by such engagement be moved, and the movement of this member 20 may effect the opening of the jaws 19 (and 19$^a$) by which the carriage engages the work. Another stop 22 may be so placed that the work itself abuts against it in sequence, immediately after the jaws 19 are opened. It will be understood, in reading Figs. 1 and 10, that stops 21 and 22 are not alined but stand at different points transversely of the carriage (see Fig. 3). By such an abutment as 22, the work itself, should it stick in the jaws, may be certainly and positively freed; and, furthermore, the material may thus be brought to rest with precision, at the point desired. It will be understood that the particular mechanism for opening the jaws is unimportant; many forms are possible.

I claim as my invention:

1. In a metal-punching machine, the combination with a punch, of a runway for the material through the punch, a support for the material adjacent said runway, a plurality of vertically movable skids pivoted at one end to said support, and power mechanism connected to said arms for raising and lowering them.

2. In a metal-punching machine, the combination of a punch, a runway for the material through the punch, a support for the material adjacent said runway a vertically movable skid arm extending between said support and said runway, an interruption in the continuity of its skid surface of the said arm, and a bridge piece movable to and from a position spanning the interruption referred to, as said skid arm moves up and down.

3. In a metal-punching machine, the combination of a punch, a spacing table provided with car tracks, a work runway lying outside of the car tracks on the spacing table, a support for material adjacent said runway, and transfer mechanism arranged between said support and said runway.

4. In a metal-punching machine, the combination with a punch, of a work runway alined with said punch, a spacing table provided with car tracks at one side of said runway, a carriage moving on said tracks, and means borne by said carriage for engaging work placed upon said runway.

5. In a metal-punching machine, the combination with a punch, of a spacing table, a work carriage movable upon said table and provided with work-engaging means, a work runway in alinement with and at one side of said table, and a carriage drive imparting propelling force to said carriage at a point between the center of gravity of said carriage and the work-engaging means thereof.

6. In a metal-punching machine, the combination of a punch, a succession of pairs of rollers yieldingly spaced one from another and constituting a runway for the material, and transfer mechanism arranged in the interval between succeeding pairs of rollers.

7. In a metal-punching machine a runway for the material including a roller coöperatting with another member and forming therewith opposite sides of a path of travel of an angle bar, said roller being movable transversely of said path of travel, and means yieldingly resistant to such transverse movement of the roller.

8. In a metal-punching machine, the combination of a punch, a runway for the material through the punch, a support for the material adjacent said runway, transfer mechanism coöperating with said support and said runway, a work carriage, a work engaging clamp on the carriage, and means operative on the movement of the carriage for opening the work-engaging clamp when the work is at the desired point on the runway.

9. In a metal-punching machine, the combination of a runway for the material, a carriage provided with a work-engaging device, and means operative on the advance of the carriage for releasing said work-engaging device.

10. In a metal-punching machine, the combination of a runway for the material, a carriage provided with a work-engaging device, means operative on the advance of the carriage for releasing said work-engaging device, and a stop for the work.

11. In a metal-punching machine, the combination with a punch, of a runway for material through the punch, a spacing table provided with a work carriage, a work-engager borne by said carriage, a stop borne by said table and operative upon the advance of the carriage to release said work-engager, and a second stop borne by the table for engaging and stopping the work after the release of said work engager.

In testimony whereof I have hereunto set my hand.

GEORGE PAUL THOMAS.

Witnesses:
BAYARD H. CHRISTY,
FRANCIS J. TOMASSON.

Copies of this patent may be obtained for five cents each, by addressing the "Commissioner of Patents, Washington, D. C."